(12) United States Patent
Biondi et al.

(10) Patent No.: US 6,817,464 B2
(45) Date of Patent: Nov. 16, 2004

(54) STORAGE UNIT FOR SUBSTANTIALLY PARALLELEPIPED-SHAPED PRODUCTS

(75) Inventors: Andrea Biondi, Bologna (IT); Fiorenzo Draghetti, Medicina (IT)

(73) Assignee: G.D Societa' Per Azioni, Bologna (IT)

( * ) Notice: Subject to any disclaimer, the term of this patent is extended or adjusted under 35 U.S.C. 154(b) by 0 days.

(21) Appl. No.: 10/462,586

(22) Filed: Jun. 13, 2003

(65) Prior Publication Data
US 2004/0035678 A1 Feb. 26, 2004

(30) Foreign Application Priority Data
Jun. 18, 2002 (IT) .................................. BO2002A0389

(51) Int. Cl.⁷ ............................................... B65G 1/00
(52) U.S. Cl. .................................. 198/347.1; 198/812
(58) Field of Search ........................... 198/347.1, 588, 198/812

(56) References Cited

U.S. PATENT DOCUMENTS

| | | | | |
|---|---|---|---|---|
| 2,932,376 A | * | 4/1960 | Millington | 198/812 |
| 3,499,555 A | | 3/1970 | Wahle | 214/16.4 |
| 4,018,325 A | | 4/1977 | Rejsa | 198/347 |
| 5,314,054 A | * | 5/1994 | van Laar | 198/347.1 |
| 5,460,258 A | | 10/1995 | Tisma | 198/430 |
| 5,611,418 A | * | 3/1997 | Helmstetter | 198/347.1 |
| 5,960,927 A | | 10/1999 | Bahr | 198/347.1 |
| 6,250,454 B1 | * | 6/2001 | Douglas | 198/347.1 |
| 6,640,960 B1 | * | 11/2003 | Spettl | 198/347.1 |

FOREIGN PATENT DOCUMENTS

| | | |
|---|---|---|
| GB | 1 530 981 | 11/1978 |
| WO | 97/42110 | 11/1997 |

* cited by examiner

Primary Examiner—James R. Bidwell
(74) Attorney, Agent, or Firm—Ladas & Parry

(57) ABSTRACT

A storage unit, wherein a store receives a succession of substantially parallelepiped-shaped products from an input conveying unit at an input and in a given feed direction, and releases a succession of rows of products to an output conveying unit at an output separate from the input; the store having a conveying device, which extends through the input and the output, has a number of elongated pockets for receiving respective rows of products, and moves in a direction crosswise to the pockets to move the pockets from the input to the output along a path portion of variable length extending about at least one pulley having an axis of rotation parallel to the pockets and to the feed direction and movable transversely to vary the length of the path portion between the input and the output.

33 Claims, 5 Drawing Sheets

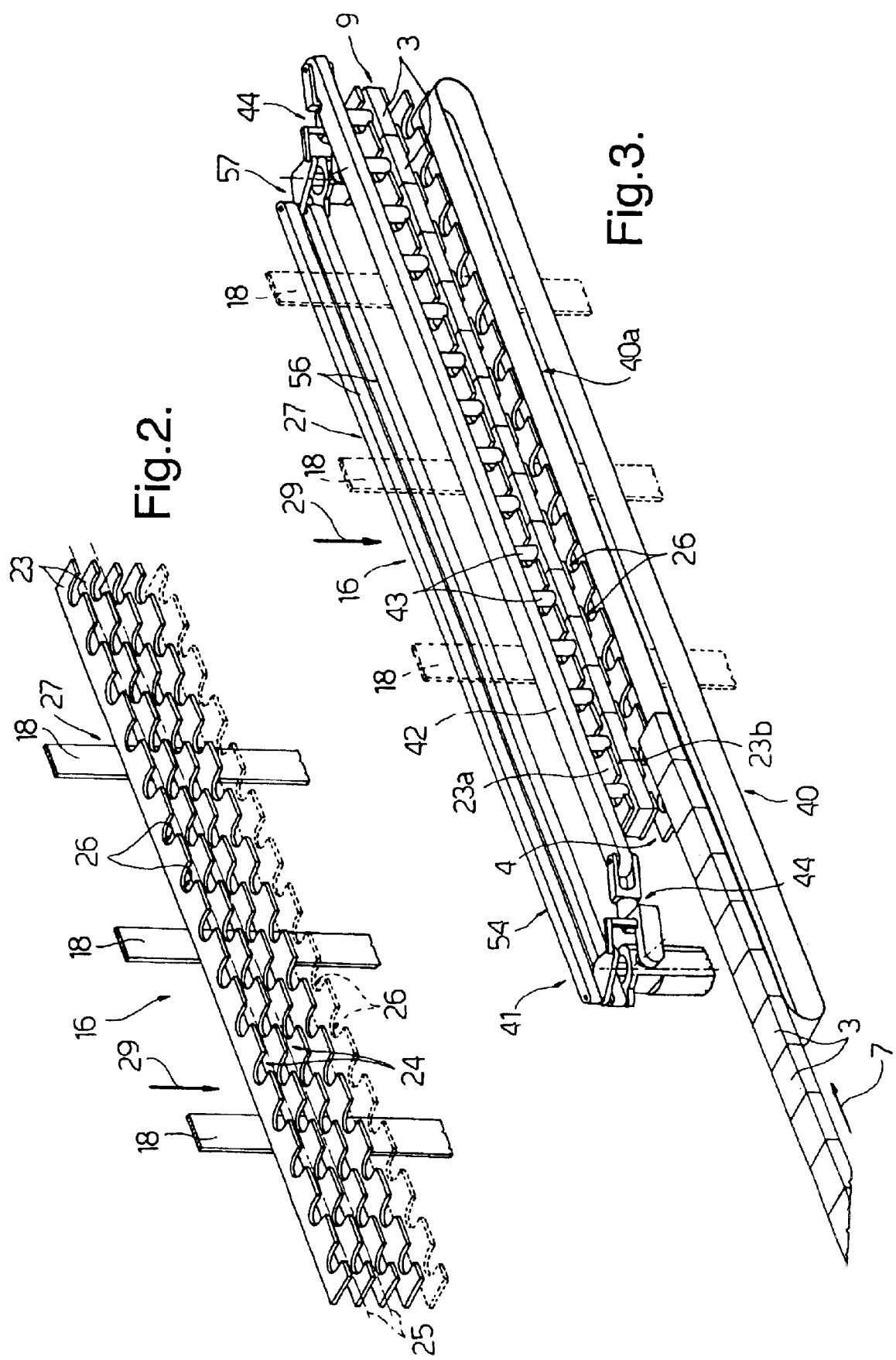

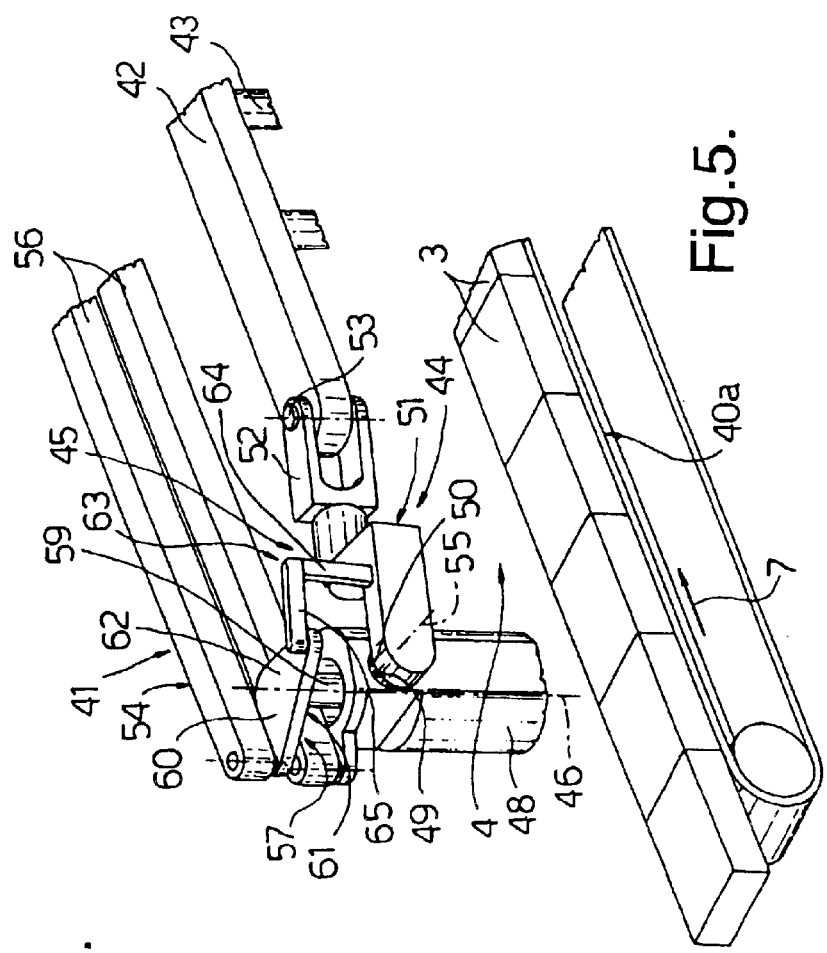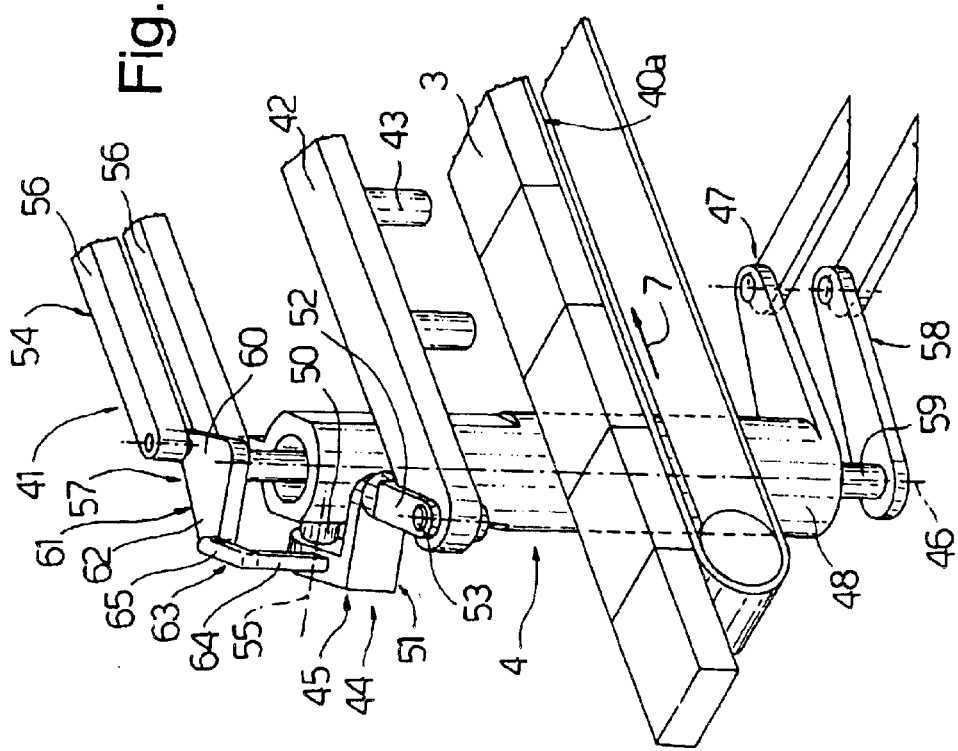

STORAGE UNIT FOR SUBSTANTIALLY PARALLELEPIPED-SHAPED PRODUCTS

The present invention relates to a storage unit for substantially parallelepiped-shaped products.

The present invention may be used to particular advantage for producing storage units for packets of cigarettes, to which the following description refers purely by way of example.

BACKGROUND OF THE INVENTION

In the tobacco industry, storage units for packets of cigarettes are normally employed between a production machine, normally a packing or cellophaning machine, and a user machine, normally a cellophaning or cartoning machine respectively, to compensate for differences in the output of the two machines.

Known packet storage units are normally FILO (First In-Last Out) types, i.e. having an input and output normally coincident with each other. Units of this sort are normally located on line and relatively compact, but have the drawback of a certain number of packets being retained for a relatively long period of time.

FIFO (First In-First Out) packet storage units are also known, which eliminate the above drawback, but which feature long coiled conveyors which are not only relatively fragile, i.e. subject to frequent damage, but also result in relatively large structures.

DE19506196 discloses a device for supplying, storing and distributing rows of products; the device comprises an input station, an output station and an intermediate FIFO store with a conveyor. In the output station there are at least two vertically off-set lift elements for sliding out the rows of products from at least two tables in the same beat onto a second and third conveyor. The conveyor device for the second and third conveyor runs across the conveyor direction of the first conveyor so that columns can be formed from the rows of products. The tables can be fixed in gondolas which hang at regular intervals with swivel movement from the conveyor.

SUMMARY OF THE INVENTION

It is an object of the present invention to provide a storage unit for substantially parallelepiped-shaped products, designed to eliminate the aforementioned drawbacks.

More specifically, it is an object of the present invention to provide a storage unit for substantially parallelepiped-shaped products, which is a FIFO type, and which at the same time is as compact and strong as possible.

According to the present invention, there is provided a storage unit for substantially parallelepiped-shaped products, as claimed in claim 1 and, preferably, in any one of the following claims dependent directly or indirectly on claim 1.

BRIEF DESCRIPTION OF THE DRAWINGS

A number of non-limiting embodiments of the present invention will be described by way of example with reference to the accompanying drawings, in which:

FIG. 2 shows a larger-scale view in perspective of a detail in FIG. 1;

FIG. 3 shows a larger-scale view in perspective of a first detail in FIG. 2;

FIGS. 4 and 5 show larger-scale views in perspective of a second detail in FIG. 2 in two different operating positions;

DETAILED DESCRIPTION OF THE INVENTION

Figure 1:
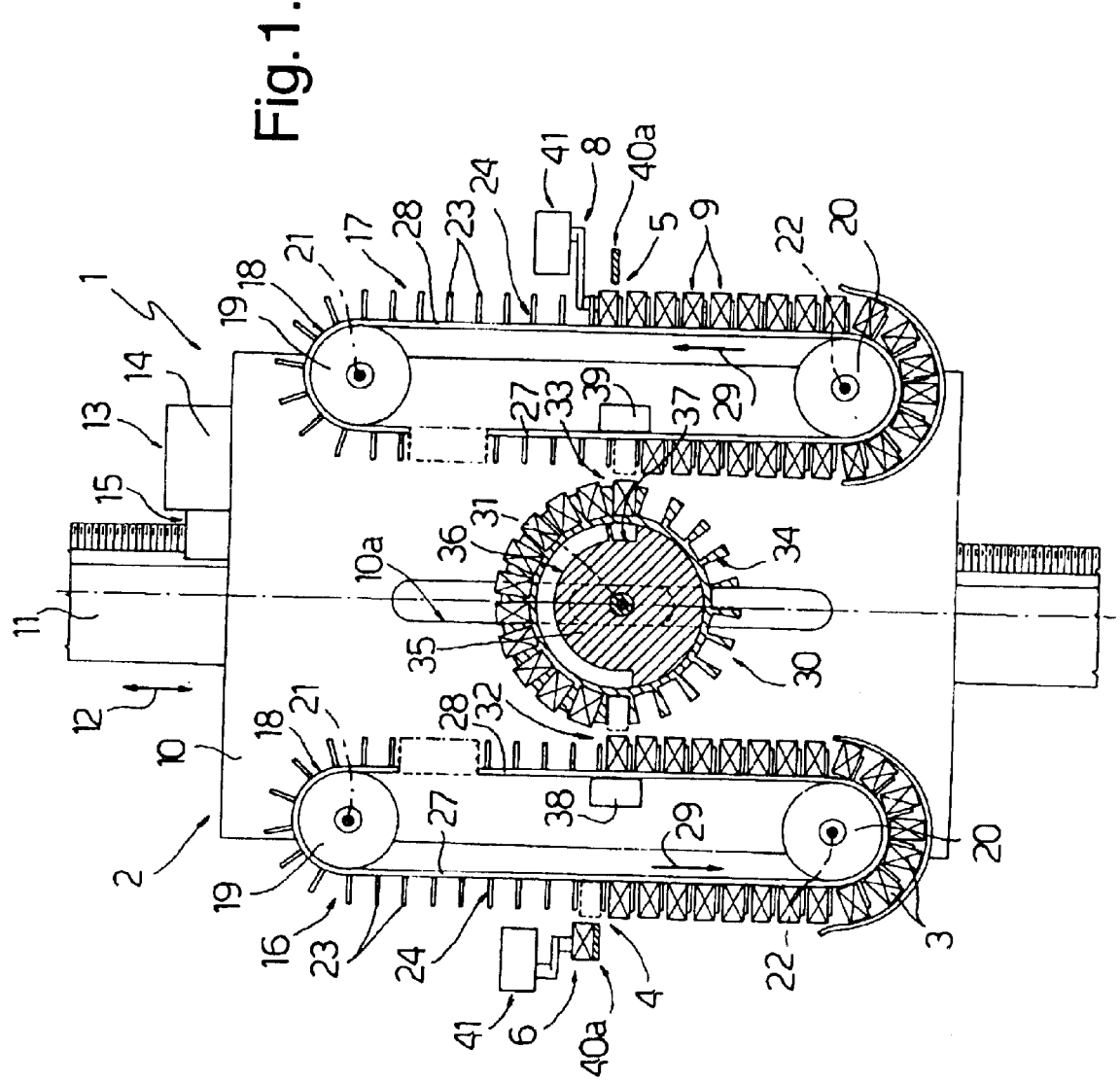
FIG. 1 shows a front view of a first preferred embodiment of the storage unit according to the present invention.

Number 1 in FIG. 1 indicates as a whole a storage unit comprising a store 2 for storing packets 3 of cigarettes and having a fixed input 4 and a fixed output 5 separate from each other and located on opposite sides of store 2, a substantially horizontal input conveying unit 6 for feeding packets 3 successively to input 4 in a direction 7 substantially perpendicular to the FIG. 1 plane, and a substantially horizontal output conveying unit 8 for successively receiving rows 9 of packets 3 at output 5.

Store 2 comprises a carriage 10 fitted to a substantially vertical rail 11, and which is moved up and down along rail 11, in a direction 12 parallel to the FIG. 1 plane and perpendicular to direction 7, by an actuating device 13 comprising, in the example shown, a motor 14 connected to rail 11 by a rack-and-pinion coupling 15.

Store 2 also comprises two parallel, side by side, endless conveyors 16 and 17 extending through input 4 and output 5 respectively, and each defined by a respective number of belts 18 (FIG. 2) looped about a respective pair of pulleys 19 and 20 fitted to carriage 10 to rotate, with respect to carriage 10, about respective axes 21 and 22 substantially parallel to direction 7 and lying in a vertical plane. Pulley 19 is located above relative pulley 20, is powered to move relative belts 18 anticlockwise in FIG. 1, and is synchronized with the other pulley 19 by an electric axis not shown.

As shown more clearly in FIG. 3, belts 18 of each conveyor 16, 17 are connected to one another by a succession of elongated plates 23 substantially parallel to direction 7 and crosswise to belts 18, and which define a succession of transverse pockets 24, each of which is defined by a top plate 23a and a bottom plate 23b, has a respective longitudinal axis 25 crosswise to belts 18 and parallel to direction 7, and receives a respective row 9 of side by side packets 3. A number of transverse slots 26 extend partly across each plate 23, from an outer longitudinal edge opposite an inner longitudinal edge fitted to relative belts 18, and are spaced along relative plate 23 with a spacing equal to the length of a packet 3 measured along longitudinal axis 25 of relative pocket 24. Each slot 26 is formed in relative plate 23 so as to be positioned centrally, in use, with respect to a respective packet 3 in the row 9 housed, in use, inside relative pocket 24.

Between relative pulleys 19 and 20, each conveyor 16, 17 comprises a vertical loading branch 27 and a vertical unloading branch 28, moving in opposite senses in a direction 29 crosswise to relative axes 25. More specifically, loading branch 27 of conveyor 16 extends through input 4; unloading branch 28 of conveyor 17 extends through output 5; and unloading branch 28 of conveyor 16 and loading branch 27 of conveyor 17 are located facing each other, and are connected by a transfer drum 30, which rotates about a fixed axis 31 parallel to axes 21 and 22, is substantially tangent to unloading branch 28 of conveyor 16 at a fixed loading station 32 facing input 4, and is substantially tangent to loading branch 27 of conveyor 17 at a fixed unloading station 33 facing output 5.

Drum 30 is rotated, clockwise in FIG. 1, by a drive shaft coaxial with axis 31 and fitted in transversely sliding manner through a slot 10a formed through carriage 10 and parallel to direction 12. Drum 30 has a number of peripheral pockets 34, each of which receives a respective row 9 and moves through loading station 32 and unloading station 33 with the same law of motion as that with which pockets 24 of conveyors 16 and 17 move through loading station 32 and unloading station 33 respectively. In the example shown, drum 30 has a fixed pneumatic distributor 35 comprising a suction chamber 36 extending through loading station 32 and substantially along the whole of the path traveled by pockets 34 from loading station 32 to unloading 33, and an expulsion chamber 37 located at unloading station 33.

Suction chamber 36 cooperates with a fixed expulsion box 38 located at loading station 32, on the opposite side of unloading branch 28 of conveyor 16 to drum 30; and expulsion chamber 37 cooperates with a fixed suction box 39 located at unloading station 33, on the opposite side of loading branch 27 of conveyor 17 to drum 30.

Since input and output conveying units 6 and 8 are specular, the following description is limited to input conveying unit 6 only.

As shown in FIG. 2, input conveying unit 6 comprises a conveyor 40 traveling in direction 7 and in turn comprising an output portion 40a located at input 4, alongside and facing conveyor 16, and of the same length as a pocket 24. Input conveying unit 6 also comprises a transfer device 41 for transferring a row 9 of packets 3 from output portion 40a of conveyor 40 to a respective pocket 24 of conveyor 16.

With reference to FIG. 2, and as shown more clearly in FIGS. 4 and 5, transfer device 41 comprises a bar 42 parallel to direction 7, generally higher than output portion 40a, and having a succession of downward-facing pneumatic gripping heads 43 arranged along bar 42 in the same way as slots 26 along plates 23. Bar 42 constitutes the connecting rod of an articulated transmission 44 defined by an articulated parallelogram comprising two crank mechanisms 45 connected to the opposite ends of bar 42, and which are oscillated about respective axes 46, parallel to direction 29, by an actuating member 47 connected to one of crank mechanisms 45. More specifically, each crank mechanism 45 comprises a hollow shaft 48, which is coaxial with relative axis 46, is oscillated about relative axis 46 by actuating member 47, and has, close to the top end, a radial hole 49, through which is fitted for rotation a transverse pin 50 of a Z-shaped crank 51, an end portion 52 of which, positioned radially with respect to relative axis 46, is connected to a relative end of bar 42 by a hinge pin 53 substantially parallel to direction 29.

Transfer device 41 also comprises a further articulated transmission 54 for controlling the angular position of cranks 51 about the axes 55 of relative pins 50, and which comprises a double connecting rod 56 substantially parallel to bar 42 and hinged, at each end, to a crank mechanism 57, which is oscillated about respective axis 46 by an actuating member 58 connected to one of crank mechanism 57. More specifically, each crank mechanism 57 comprises a shaft 59, which extends through relative hollow shaft 48, is coaxial with relative axis 46, is oscillated by actuating member 58 about relative axis 46 with the same oscillation period as actuating member 47, and is fitted, at the top end projecting from the top end of relative hollow shaft 48, with a crank 60 hinged to the relative end of double connecting rod 56 and defining one arm of a differential member defined by a rocker arm 61 hinged about relative axis 46 and comprising a further arm 62 connected to an intermediate point of relative crank 51 by an elastically deformable transmission 63 comprising a rigid pin 64 projecting upwards from an intermediate point of crank 51 and integral with crank 51 itself, and a leaf spring 65 connecting the free end of pin 64 to the free end of arm 62.

In storage unit 1 described, conveyors 40, 16, 17 and transfer drum 30 all operate continuously, and each row 9 of packets 3, on being fed continuously to input 4 by conveyor 40 of input conveying unit 6, is transferred transversely by relative transfer device 41 into a respective pocket 24 of conveyor 16, and is then fed by conveyor 16 to loading station 32, where it is transferred into a relative pocket 34 of drum 30 by expulsion box 38 and suction chamber 36. Each row 9 is retained by suction inside relative pocket 34 up to unloading station 33, where it is transferred to a respective pocket 24 of conveyor 17 by the thrust imparted to row 9 by the compressed air issuing from expulsion chamber 37 and by the air aspirated by suction box 39. Row 9 is then fed by conveyor 17 to output 5, where it is gripped by transfer device 41 of output conveying unit 8 and transferred to conveyor 40 of output conveying unit 8.

Since input 4, output 5, loading station 32, and unloading station 33 are fixed, carriage 10 need simply be moved up and down in direction 12 to reduce and increase the capacity of store 2 respectively.

Figure 6:
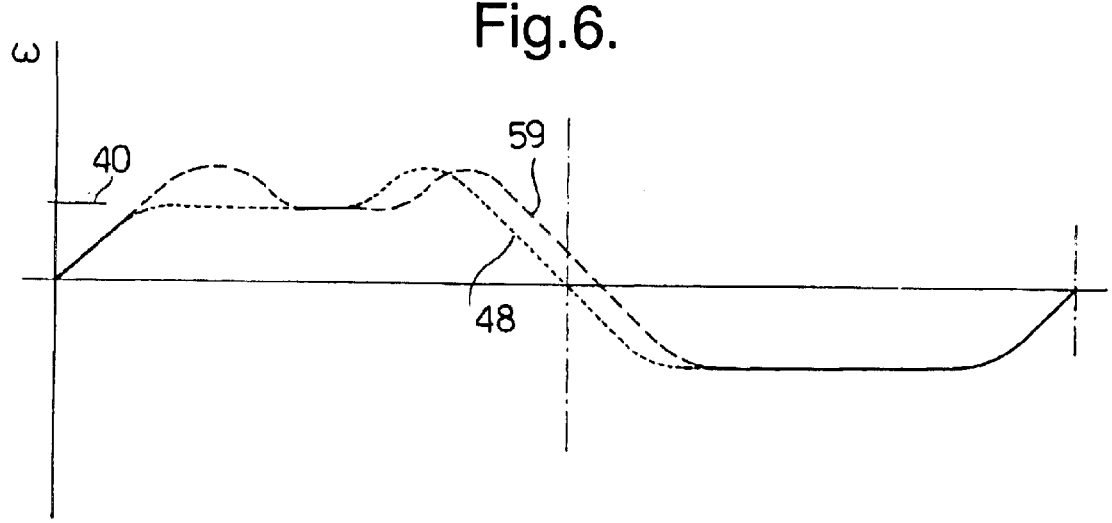
FIG. 6 shows an operating graph of the detail in FIGS. 4 and 5.

The transfer of a row 9 of packets 3 from conveyor 40 of input conveying unit 6 to the relative pocket 24 of conveyor 16, which, in the example shown, moves continuously downwards in direction 29, will now be described with reference to FIGS. 4 to 6.

As row 9 approaches portion 40a of conveyor 40, transfer device 41 is in the initial position shown in FIG. 4, in which bar 42 is withdrawn, in direction 7, with respect to portion 40a, and raised over the top surface of packets 3 in row 9 on portion 40a. At this point, actuating members 47 and 58 are operated to rotate shafts 48 and 59 clockwise in FIG. 4 at the same angular speed, and to accelerate bar 42 so that it is positioned over row 9 and travels in direction 7 at the same speed as conveyor 40, with pneumatic heads 43 in time with packets 3 in row 9.

At this point, the angular speed of hollow shaft 48 is maintained constant to allow bar 42 to follow row 9 as it travels in direction 7, while shaft 59 is accelerated further to rotate rocker arm 61 clockwise in FIG. 4 with respect to hollow shaft 48. Rocker arm 61 acts as a differential member, and, by overtaking hollow shaft 48, compresses leaf spring 65 and, via pin 64, exerts a downward moment on crank 51, which rotates downwards about axis 55 to bring pneumatic heads 43 into contact with relative packets 3 in row 9 on portion 40a.

At this point, the angular speeds of shafts 48 and 59 are varied with respect to each other to allow bar 42 to lift row 9 off portion 40a, accelerate row 9 with respect to conveyor 40 to detach it from the following packets 3, move row 9 over to relative pocket 24, and insert row 9 inside relative pocket 24, while following the downward movement of pocket 24. As shown in FIG. 2, insertion terminates when pneumatic heads 43 engage relative slots 26 in plate 23a of relative pocket 24; at which point, bar 42 starts to move back into the initial raised, withdrawn position.

Rows 9 are transferred from relative pockets 24 of conveyor 17 to conveyor 40 of output conveying unit 8 in the same way as described above, only specularly.

In a variation not shown, conveyor 17 and transfer drum 30 are dispensed with, and only conveyor 16 is used, the loading branch 27 of which extends, as in the example shown, through input 4, and the unloading branch 28 of which extends through output 5. Alternatively, in a further variation not shown, the capacity of store 2 described is increased by inserting, between transfer drum 30 and conveyor 17, one or more auxiliary units, each defined by a conveyor similar to conveyors 16 and 17, and a drum similar to transfer drum 30.

Figure 7:
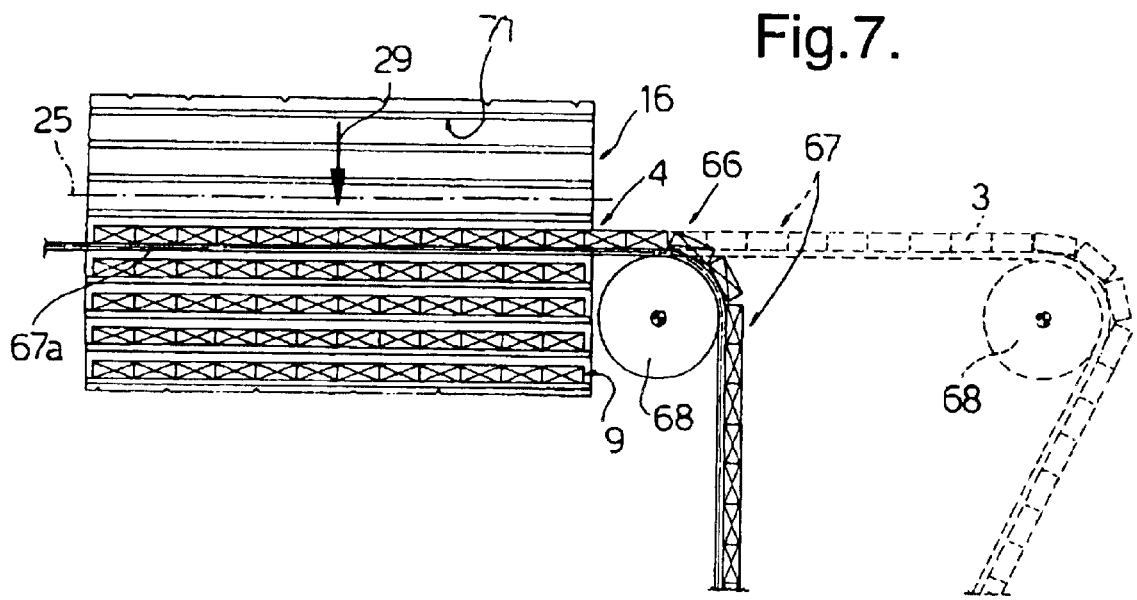
FIG. 7 shows a schematic side view of a variation of the FIG. 2 detail.
Figure 8:
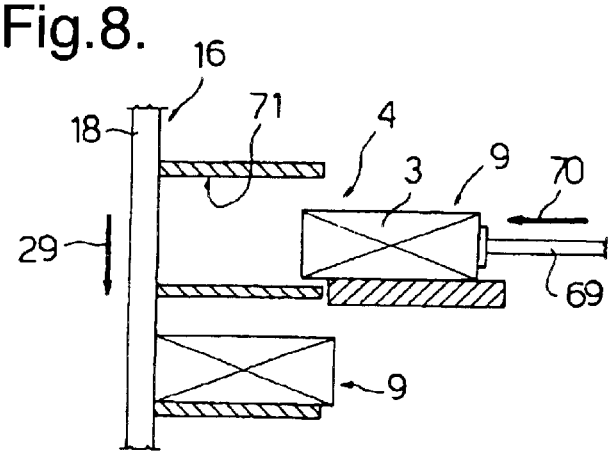
FIG. 8 shows a schematic, partial cross section of the FIG. 7 detail.

In the variation shown in FIGS. 7 and 8, at least input conveying unit 6 is replaced by an input conveying unit 66 comprising a conveyor 67 traveling continuously in direction 7 and having a portion 67a extending through input 4 in the position occupied in FIG. 2 by portion 40a. Upstream from input 4 in direction 7, conveyor 67 has a compensating pulley 68, which is movable in known manner in direction 7 to adjust the portion of conveyor 67 extending between input 4 and a loading station (not shown) where packets 3 are loaded onto conveyor 67, so as to temporarily arrest a row 9 at input 4 as the row 9 is transferred to conveyor 16.

Since, in the FIG. 7 variation, row 9 is stationary as it is transferred, transfer device 41 in FIG. 2 can be replaced by a straightforward push device 69 moving back and forth in a direction 70 crosswise to direction 7. Obviously, to enable insertion of row 9 inside a relative pocket on conveyor 16, pockets 24 in FIG. 2 are replaced by pockets 71, which are higher than pockets 24 by such an amount that the difference between the height of each pocket 71 and the thickness of packets 3 in direction 29 is approximately equal to, but no less than, the distance traveled by conveyor 16 while row 9 is being inserted into relative pocket 71. Similarly, the height of the pockets (not shown) on conveyor 17 is also increased.

At output 5, push device 69 at input 4 is replaced by a push device (not shown) mounted between loading branch 27 and unloading branch 28 of conveyor 17, and moving crosswise to direction 29 between belts 18 of unloading branch 28 of conveyor 17, or by a suction bar (not shown but similar to bar 42) located outwards of unloading branch 28 of conveyor 17, in the same position as push device 69 with respect to loading branch 27 of conveyor 16.

The above variations may, obviously, be combined in any way, as required.

The above embodiments all provide for operating conveyors 40, 16 and 17 continuously, though conveyors 16 and 17 and/or conveyors 40 may obviously also be step-operated.

If conveyors 16 and 17 are step-operated, the height of pockets 24, 71 is always slightly more than the thickness of packets 3, and the movements of transfer devices 41 are altered to enable straight insertion and extraction of rows 9 into and from pockets 24, 71.

If conveyor 67 is step-operated, compensating pulley 68 is obviously eliminated, and the movement of relative bars 42 of transfer devices 41 is altered to delay contact between pneumatic heads 43 and packets 3 in row 9 for removal, so as to only exploit the movement of bars 42 in a direction substantially crosswise to direction 7.

Figure 9:
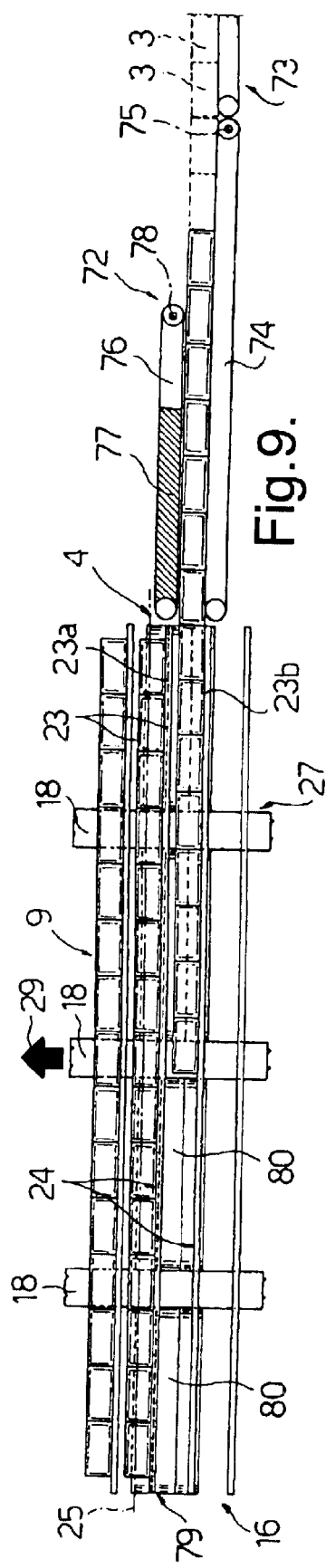
FIGS. 9 and 10 show side views of a further variation of the FIG. 2 detail in two different operating positions.
Figure 10:
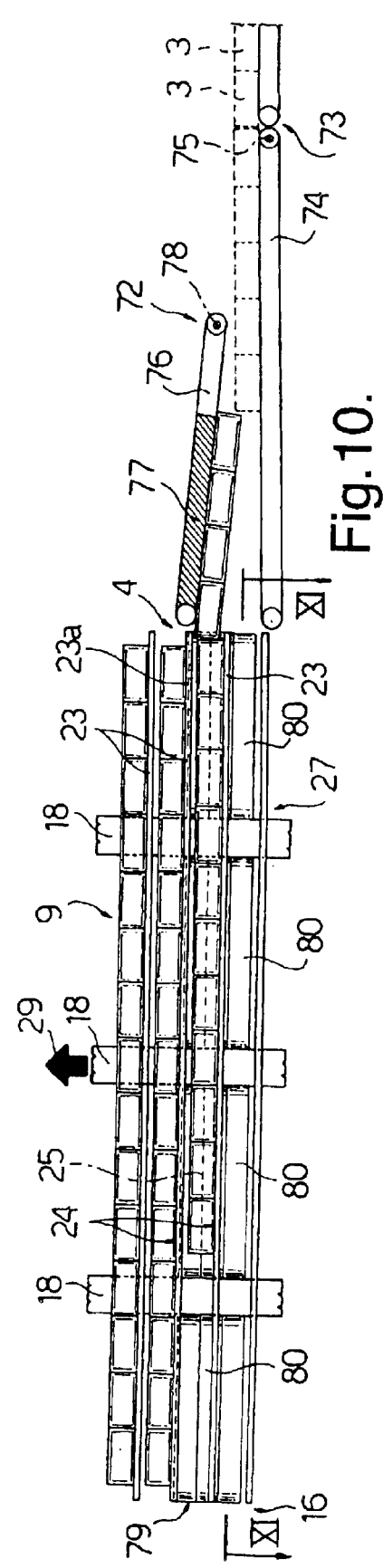
Figure 11:
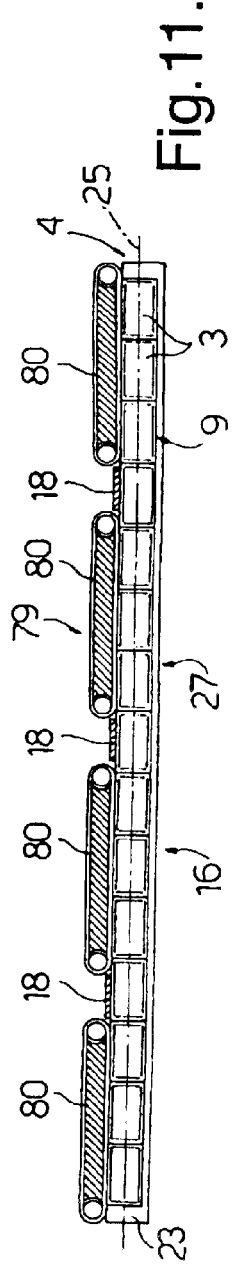
FIG. 11 shows a section along line XI—XI in FIG. 10.

In the variation shown in FIGS. 9 to 11, conveyors 16 and 17 (of which only conveyor 16 is shown) travel at constant speed in direction 29 (which, in the FIGS. 9–11 example, is upwards), and input conveying unit 6 in FIGS. 1 and 2 is replaced by an input conveying unit 72 located at input 4 and aligned with a plane traveled along by longitudinal axes 25 of pockets 24 traveling through input 4. A conveying unit (not shown) similar to input conveying unit 72 may be used at output 5.

Input conveying unit 72 comprises a feed conveyor 73, which feeds rows 9 successively in direction 7 to input 4, is positioned with its output end facing an axial end of pockets 24, and in turn comprises an output portion 74 preferably of the same length as a row 9, and which is mounted to rock, at the input end and about an axis 75 perpendicular to directions 7 and 29, between a substantially horizontal lowered position (FIG. 10), and a raised position (FIG. 9) wherein the output end of feed conveyor 73 is raised with respect to the lowered position by a distance substantially equal to the height of a pocket 24.

Input conveying unit 72 also comprises a lift conveyor 76, which is permeable to air, successively engages the top surfaces of packets 3 in a row 9, and is located over an output end portion of output portion 74 of feed conveyor 73. Lift conveyor 76 is operated at the same speed as feed conveyor 73, has an output portion looped about a suction box 77, and is mounted to rock, at the input end and about an axis 78 parallel to axis 75, between a lowered position (FIG. 9) sloping upwards and substantially parallel to output portion 74 of feed conveyor 73 in the raised position, and a raised position (FIG. 10) wherein the output end of lift conveyor 76 slopes further upwards and is separated from the output end of feed conveyor 73, in the lowered position, by a distance substantially equal to the height of two pockets 24.

As shown in FIG. 11, input conveying unit 72 also comprises a transportation conveyor 79 in a fixed position at input 4 and inwardly limiting pockets 24 traveling through input 4. In the example shown, transportation conveyor 79 is defined by a succession of endless suction belts 80 aligned in direction 7, and each of which is located in the gap between two belts 18, moves in direction 7 at the same speed as feed conveyor 73, and is nearly twice the height of a pocket 24.

In actual use, when the leading end of a row 9 on feed conveyor 73 approaches the output end of feed conveyor 73, output portion 74, initially in the lowered position, is raised gradually to follow a relative pocket 24 traveling upwards in direction 29, so that row 9 can be gradually inserted axially inside pocket 24 by both feed conveyor 73 and transportation conveyor 79. Output portion 74 continues rising until the packets 3 in a trailing portion of row 9 still outside relative pocket 24 contact lift conveyor 76, which retains them by suction and rises even further to follow pocket 24 and take over from feed conveyor 73 to ensure, together with transportation conveyor 79, full insertion of row 9 inside pocket 24. At the same time, output portion 74 of feed conveyor 73 moves back into the lowered position to feed the next row to the next pocket 24.

What is claimed is:

1. A storage unit for substantially parallelepiped-shaped products, the unit (1) comprising a store (2) having an input (4) and an output (5) separate from each other, a first conveying unit (6; 66; 72) for feeding rows (9) of said products (3) successively to said input (4) in a given first direction (7), and a second conveying unit (8) for receiving said rows (9) successively at said output (5); said store (2) comprising conveying means (16, 17, 30), which extend through said input (4) and said output (5), have a number of elongated pockets (24; 71) having respective parallel longitudinal first axes (25), and each for receiving a respective said row (9), and move in a given second direction (29) crosswise to said first axes (25) to move said pockets (24;

71) from said input (4) to said output (5) along a path portion of variable length; and said store (2) comprising varying means (13) for varying the length of said path portion by determining a relative movement between said conveying means (16, 17, 30) and said input (4) and/or output (5) in order to change the portions of the conveying means (16, 17, 30) faced to said input (4) and/or output (5); said conveying means (16, 17, 30) comprising at least two parallel, side by side endless conveyors (16, 17) extending through said input (4) and output (5), and a transfer drum (30) interposed between the two endless conveyor (16, 17).

2. A unit as claimed in claim 1, wherein said input (4) and output (5) are located in relevant fixed positions; at least part of the conveying means (16, 17, 30) being mounted for sliding along a varying direction (12); and the varying means (13) comprising a motor (13) for imparting to at least part of the conveying means (16, 17, 30) a movement along the varying direction (12).

3. A unit as claimed in claim 1, wherein the endless conveyor (16, 17) are mounted for sliding along the varying direction (12) and the transfer drum (30) is located in relevant fixed position.

4. A unit as claimed in claim 1, wherein the path portion of variable length extends about at least one pulley (19, 20) having a second axis (21, 22) of rotation parallel to said first axes (25) and to said first direction (7) and movable in a third direction (12) crosswise to said first axes (25) and to said first direction (7) to vary said length.

5. A unit as claimed in claim 4, wherein at least one said conveying unit (6, 8; 66) comprises a conveyor (40; 67) having an end portion (40a, 67a) facing said pockets (24; 71) and for supporting a said row (9); and transfer means (41; 69) for transferring said row (9), crosswise to said first direction (7), between said end portion (40a; 67a) and the relative said pocket (24; 71).

6. A unit as claimed in claim 5, wherein said transfer means (41) comprise a suction bar (42) parallel to said first axes (25) and movable cyclically through a first position facing said end portion (40a), and a second position engaging a relative said pocket (24; 71).

7. A unit as claimed in claim 6, wherein said transfer means (41) comprise an articulated transmission (44), in turn comprising a connecting rod defined by said suction bar (42), and two crank mechanisms (45) located on opposite sides of said suction bar (42) and oscillating about respective third axes (46) parallel to said second direction (29).

8. A unit as claimed in claim 7, wherein said conveyor (40) moves at constant speed; said crank mechanisms (45), in use, moving said suction bar (42) through said first position at a speed equal to the speed of said conveyor (40).

9. A unit as claimed in claim 7, wherein said conveying means (16, 17, 30) move at constant speed in said second direction (29); and each said crank mechanism (45) comprises a crank (51) oscillating about the respective said third axis (46) and about a respective fourth axis (55) parallel to said first axes (25); control means (54) being provided to control the angular position of each said crank (51) about the relative fourth axis (55), and for moving said suction bar (42) through said second position and in said second direction (29) at a speed equal to a speed of said conveying means (16, 17, 30) in said second direction (29).

10. A unit as claimed in claim 9, wherein each said crank mechanism (45) comprises a first shaft (48) coaxial with the relative said third axis (46), and first actuating means (47) for oscillating said first shaft (48) about the relative third axis (46) with a given oscillation period; each said crank (51) being connected to the relative said first shaft (48) to oscillate with the relative said first shaft (48) about the relative said third axis (46), and to be oscillated, with respect to the relative said first shaft (48), about the relative said fourth axis (55) by said control means (54).

11. A unit as claimed in claim 10, wherein said control means (54) comprise, for each said crank (51), a second shaft (59) coaxial with the relative said third axis (46); second actuating means (58) for oscillating said second shaft (59) about the relative said third axis (46) with a period equal to said given period; and differential means (61) interposed between said second shaft (59) and the relative said crank (51), to convert a difference between the angular speeds of said first shaft and said second shaft (59) in said period into rotation of said crank (51) about the relative said fourth axis (55).

12. A unit as claimed in claim 11, wherein said differential means (61) comprise, for each said second shaft (59), a further crank (62) fitted to said second shaft (59); and an elastically deformable transmission (63) interposed between said further crank (62) and an intermediate point of the relative said crank (51).

13. A unit as claimed in claim 5, wherein said conveying means (16, 17, 30) move in steps in said second direction (29), and said end portion (67a) of said conveyor (67) moves in steps in said first direction (7); said transfer means (69) comprising a push device (69) moving crosswise to said first and said second direction (7, 29).

14. A unit as claimed in claim 5, wherein said conveying means (16, 17, 30) move at constant speed in said second direction (29), and said end portion (67a) of said conveyor (67) moves in steps in said first direction (7); said transfer means (69) comprising a push device (69) moving crosswise to said first and said second direction (7, 29); and each said pocket (71) being of such a height, measured in said second direction (29), as to enable the pocket (71) to receive the relative said row (9) with a clearance in said second direction (29).

15. A unit as claimed in claim 13, wherein said conveyor (67) moves continuously, and comprises compensating means (68) for moving said end portion (67a) in steps.

16. A unit as claimed in claim 4, wherein said conveying means (16, 17, 30) move at constant speed in said second direction (29); and at least one said conveying unit (72) comprises a feed conveyor (73) for feeding said rows (9) successively in said first direction (7); said feed conveyor (73) comprising an end portion (74) positioned with a free end facing an axial end of said pockets (24).

17. A unit as claimed in claim 16, wherein said end portion (74) is mounted to rock, at an end opposite said free end, and about a fifth axis (75) perpendicular to said first and second direction (7, 29), between a substantially horizontal lowered position, and a raised position wherein said free end is raised, with respect to the position of the free end in said lowered position, by a distance substantially equal to a height of a said pocket (24) measured in said second direction (29).

18. A unit as claimed in claim 17, wherein said conveying unit (72) also comprises a suction lift conveyor (76) over said end portion (74); said lift conveyor (76) having a first end facing an axial end of said pockets (24), and being mounted to rock, at a second end opposite said first end, and about a sixth axis (78) parallel to said fifth axis (75), between a first position sloping upwards towards said pockets (24), and a second position sloping further upwards; said first end, in said second position, being separated from said free end of said end portion (74), in said lowered position, by a distance substantially equal to the height of two said pockets (24).

19. A unit as claimed claim 16, wherein said conveying unit (72) also comprises a suction transportation conveyor (79) in a fixed position aligned with said feed conveyor (73), and inwardly limiting said pockets (24) as the pockets (24) move, in use, through a position of alignment with said feed conveyor (73); said transportation conveyor (79) being movable in said first direction (7) with said feed conveyor (73).

20. A unit as claimed in claim 19, wherein said transportation conveyor (79) is a suction conveyor.

21. A storage unit for substantially parallelepiped-shaped products, the unit (1) comprising a store (2) having an input (4) and an output (5) separate from each other, a first conveying unit (6; 66; 72) for feeding rows (9) of said products (3) successively to said input (4) in a given first direction (7), and a second conveying unit (8) for receiving said rows (9) successively at said output (5); said store (2) comprising conveying means (16, 17, 30), which extend through said input (4) and said output (5), have a number of elongated pockets (24; 71) having respective parallel longitudinal first axes (25), and each for receiving a respective said row (9), and move in a given second direction (29) crosswise to said first axes (25) to move said pockets (24; 71) from said input (4) to said output (5) along a path portion of variable length; and said store (2) comprising varying means (13) for varying the length of said path portion by determining a relative movement between said conveying means (16, 17, 30) and said input (4) and/or output (5) in order to change the portions of the conveying means (16, 17, 30) faced to said input (4) and/or output (5); the path portion of variable length extending about at least one pulley (19, 20) having a second axis (21, 22) of rotation parallel to said first axes (25) and to said first direction (7) and movable in a third direction (12) crosswise to said first axes (25) and to said first direction (7) to vary said length; at least one said conveying unit (6, 8; 66) comprising a conveyor (40; 67) having an end portion (40a, 67a) facing said pockets (24; 71) and for supporting a said row (9), and transfer means (41; 69) for transferring said row (9), crosswise to said first direction (7), between said end portion (40a; 67a) and the relative said pocket (24; 71); said transfer means (41) comprising a suction bar (42) parallel to said first axes (25) and movable cyclically through a first position facing said end portion (40a), and a second position engaging a relative said pocket (24; 71).

22. A unit as claimed in claim 21, wherein said transfer means (41) comprise an articulated transmission (44), in turn comprising a connecting rod defined by said suction bar (42), and two crank mechanisms (45) located on opposite sides of said suction bar (42) and oscillating about respective third axes (46) parallel to said second direction (29).

23. A unit as claimed in claim 22, wherein said conveyor (40) moves at constant speed; said crank mechanisms (45), in use, moving said suction bar (42) through said first position at a speed equal to the speed of said conveyor (40).

24. A unit as claimed in claim 22, wherein said conveying means (16, 17, 30) move at constant speed in said second direction (29); and each said crank mechanism (45) comprises a crank (51) oscillating about the respective said third axis (46) and about a respective fourth axis (55) parallel to said first axes (25); control means (54) being provided to control the angular position of each said crank (51) about the relative fourth axis (55), and for moving said suction bar (42) through said second position and in said second direction (29) at a speed equal to a speed of said conveying means (16, 17, 30) in said second direction (29).

25. A unit as claimed in claim 24, wherein each said crank mechanism (45) comprises a first shaft (48) coaxial with the relative said third axis (46), and first actuating means (47) for oscillating said first shaft (48) about the relative third axis (46) with a given oscillation period; each said crank (51) being connected to the relative said first shaft (48) to oscillate with the relative said first shaft (48) about the relative said third axis (46), and to be oscillated, with respect to the relative said first shaft (48), about the relative said fourth axis (55) by said control means (54).

26. A unit as claimed in claim 25, wherein said control means (54) comprise, for each said crank (51), a second shaft (59) coaxial with the relative said third axis (46); second actuating means (58) for oscillating said second shaft (59) about the relative said third axis (46) with a period equal to said given period; and differential means (61) interposed between said second shaft (59) and the relative said crank (51), to convert a difference between the angular speeds of said first shaft and said second shaft (59) in said period into rotation of said crank (51) about the relative said fourth axis (55).

27. A unit as claimed in claim 26, wherein said differential means (61) comprise, for each said second shaft (59), a further crank (62) fitted to said second shaft (59); and an elastically deformable transmission (63) interposed between said further crank (62) and an intermediate point of the relative said crank (51).

28. A storage unit for substantially parallelepiped-shaped products, the unit (1) comprising a store (2) having an input (4) and an output (51 separate from each other, a first conveying unit (6; 66; 72) for feeding rows (9) of said products (3) successively to said input (4) in a given first direction (7), and a second conveying unit (8) for receiving said rows (9) successively at said output (5); said store (2) comprising conveying means (16, 17, 30), which extend through said input (4) and said output (5), have a number of elongated pockets (24; 71) having respective parallel longitudinal first axes (25), and each for receiving a respective said row (9), and move in a given second direction (29) crosswise to said first axes (25) to move said pockets (24; 71) from said input (4) to said output (5) along a path portion of variable length; and said store (2) comprising varying means (13) for varying the length of said path portion by determining a relative movement between said conveying means (16, 17, 30) and said input (4) and/or output (5) in order to change the portions of the conveying means (16, 17, 30) faced to said input (4) and/or output (5); the path portion of variable length extending about at least one pulley (19, 20) having a second axis (21, 22) of rotation parallel to said first axes (25) and to said first direction (7) and movable in a third direction (12) crosswise to said first axes (25) and to said first direction (7) to vary said length; at least one said conveying unit (6, 8; 66) comprising a conveyor (40; 67) having an end portion (40a, 67a) facing said pockets (24; 71) and for supporting a said row (9), and transfer means (41; 69) for transferring said row (9), crosswise to said first direction (7), between said end portion (40a; 67a) and the relative said pocket (24; 71); said conveying means (16, 17, 30) moving at constant speed in said second direction (29), and said end portion (67a) of said conveyor (67) moves in steps in said first direction (7); said transfer means (69) comprising a push device (69) moving crosswise to said first and said second direction (7, 29); and each said pocket (71) being of such a height, measured in said second direction (29), as to enable the pocket (71) to receive the relative said row (9) with a clearance in said second direction (29).

29. A storage unit for substantially parallelepiped-shaped products, the unit (1) comprising a store (2) having an input (4) and an output (5) separate from each other, a first conveying unit (6; 66; 72) for feeding rows (9) of said products (3) successively to said input (4) in a given first direction (7), and a second conveying unit (8) for receiving said rows (9) successively at said output (5); said store (2) comprising conveying means (16, 17, 30), which extend through said input (4) and said output (5), have a number of elongated pockets (24; 71) having respective parallel longitudinal first axes (25), and each for receiving a respective said row (9), and move in a given second direction (29) crosswise to said first axes (25) to move said pockets (24; 71) from said input (4) to said output (5) along a path portion of variable length; and said store (2) comprising varying means (13) for varying the length of said path portion by determining a relative movement between said conveying means (16, 17, 30) and said input (4) and/or output (5) in order to change the portions of the conveying means (16, 17, 30) faced to said input (4) and/or output (5); the path portion of variable length extending about at least one pulley (19, 20) having a second axis (21, 22) of rotation parallel to said first axes (25) and to said first direction (7) and movable in a third direction (12) crosswise to said first axes (25) and to said first direction (7) to vary said length; said conveying means (16, 17, 30) moving at constant speed in said second direction (29); and at least one said conveying unit (72) comprising a feed conveyor (73) for feeding said rows (9) successively in said first direction (7); said feed conveyor (73) comprising an end portion (74) positioned with a free end facing an axial end of said pockets (24).

30. A unit as claimed in claim 29, wherein said end portion (74) is mounted to rock, at an end opposite said free end, and about a fifth axis (75) perpendicular to said first and second direction (7, 29), between a substantially horizontal lowered position, and a raised position wherein said free end is raised, with respect to the position of the free end in said lowered position, by a distance substantially equal to a height of a said pocket (24) measured in said second direction (29).

31. A unit as claimed in claim 30, wherein said conveying unit (72) also comprises a suction lift conveyor (76) over said end portion (74); said lift conveyor (76) having a first end facing an axial end of said pockets (24), and being mounted to rock, at a second end opposite said first end, and about a sixth axis (78) parallel to said fifth axis (75), between a first position sloping upwards towards said pockets (24), and a second position sloping further upwards; said first end, in said second position, being separated from said free end of said end portion (74), in said lowered position, by a distance substantially equal to the height of two said pockets (24).

32. A unit as claimed claim 29, wherein said conveying unit (72) also comprises a suction transportation conveyor (79) in a fixed position aligned with said feed conveyor (73), and inwardly limiting said pockets (24) as the pockets (24) move, in use, through a position of alignment with said feed conveyor (73); said transportation conveyor (79) being movable in said first direction (7) with said feed conveyor (73).

33. A unit as claimed in claim 32, wherein said transportation conveyor (79) is a suction conveyor.

* * * * *